US009463485B2

(12) United States Patent
Rivas et al.

(10) Patent No.: US 9,463,485 B2
(45) Date of Patent: Oct. 11, 2016

(54) FLUID EJECTION DEVICE

(75) Inventors: Rio Rivas, Corvallis, OR (US); Corey Deyo, Albany, OR (US); Ed Friesen, Corvallis, OR (US)

(73) Assignee: HEWLETT-PACKARD DEVELOPMENT COMPANY, L.P., Houston, TX (US)

( * ) Notice: Subject to any disclaimer, the term of this patent is extended or adjusted under 35 U.S.C. 154(b) by 130 days.

(21) Appl. No.: 14/375,672

(22) PCT Filed: Apr. 24, 2012

(86) PCT No.: PCT/US2012/034791
§ 371 (c)(1),
(2), (4) Date: Jul. 30, 2014

(87) PCT Pub. No.: WO2013/162518
PCT Pub. Date: Oct. 31, 2013

(65) Prior Publication Data
US 2015/0034734 A1 Feb. 5, 2015

(51) Int. Cl.
*H01B 13/00* (2006.01)
*B05B 17/06* (2006.01)
*B41J 2/175* (2006.01)
(Continued)

(52) U.S. Cl.
CPC ......... *B05B 17/0615* (2013.01); *B23K 26/362* (2013.01); *B41J 2/1601* (2013.01); *B41J 2/1603* (2013.01); *B41J 2/164* (2013.01); *B41J 2/1607* (2013.01); *B41J 2/1628* (2013.01); *B41J 2/1629* (2013.01); *B41J 2/1631* (2013.01); *B41J 2/1634* (2013.01); *B41J 2/1642* (2013.01); *B41J 2/17553* (2013.01)

(58) Field of Classification Search
CPC .. B41J 2202/22; B41J 2/1629; B41J 2/1628; H05K 2201/09827; H05K 3/06
USPC ........................................ 216/17, 19, 27, 39
See application file for complete search history.

(56) References Cited

U.S. PATENT DOCUMENTS

| 4,680,859 A | 7/1987 | Johnson |
| 6,930,055 B1 * | 8/2005 | Bhowmik .............. B41J 2/1603 438/745 |
| 7,552,533 B2 | 6/2009 | Fartash |

(Continued)

FOREIGN PATENT DOCUMENTS

| TW | 200709951 | 3/2007 |
| WO | WO-2011053288 A1 | 5/2011 |

OTHER PUBLICATIONS

PCT International Search Report and Written Opinion for PCT/US2012/034791, mailed Jan. 2, 2013, 8 pgs.

*Primary Examiner* — Binh X Tran
(74) *Attorney, Agent, or Firm* — Dicke, Billig & Czaja, PLLC

(57) ABSTRACT

A method of forming a substrate for a fluid ejection device includes forming an opening through the substrate, with the opening having a long axis profile and a short axis profile, and with the long axis profile including a first portion extending from a minimum dimension of the long axis profile to a first side of the substrate, and a second portion including and extending from the minimum dimension of the long axis profile to a second side of the substrate opposite the first side. The method also includes forming a protective layer on sidewalls of the second portion of the long axis profile of the opening and excluding the protective layer from sidewalls of the first portion of the long axis profile of the opening.

14 Claims, 13 Drawing Sheets

(51) Int. Cl.
   *B41J 2/16*  (2006.01)
   *B23K 26/36* (2014.01)

(56) References Cited

U.S. PATENT DOCUMENTS

| | | |
|---|---|---|
| 7,895,750 B2 | 3/2011 | Park et al. |
| 2002/0191054 A1 | 12/2002 | Liu et al. |
| 2004/0055145 A1 | 3/2004 | Buswell |
| 2005/0083372 A1 | 4/2005 | Obert et al. |
| 2005/0253902 A1 | 11/2005 | Fartash |
| 2009/0233386 A1 | 9/2009 | Guan et al. |
| 2010/0141709 A1 | 6/2010 | Debrabander et al. |
| 2010/0163116 A1* | 7/2010 | Fang .................. B41J 2/14056 137/334 |
| 2010/0253743 A1 | 10/2010 | Takeuchi |
| 2011/0018930 A1 | 1/2011 | Bhwomik et al. |
| 2011/0141195 A1* | 6/2011 | Kang .................. B41J 2/1433 347/47 |

\* cited by examiner

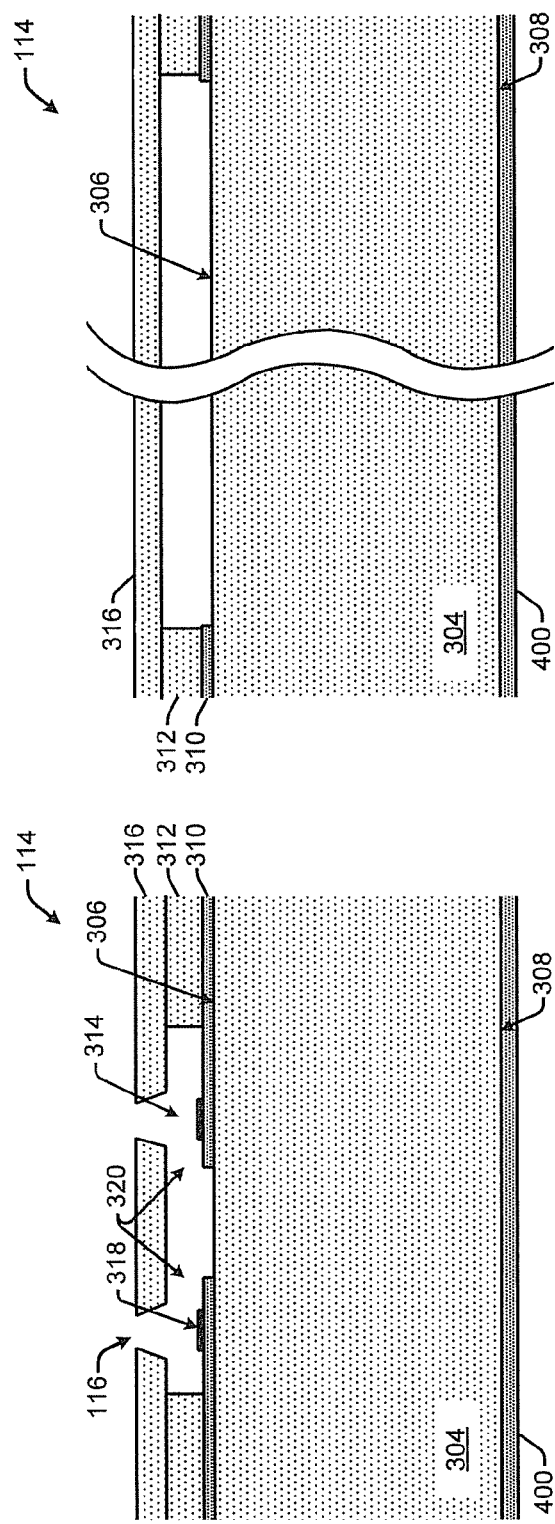

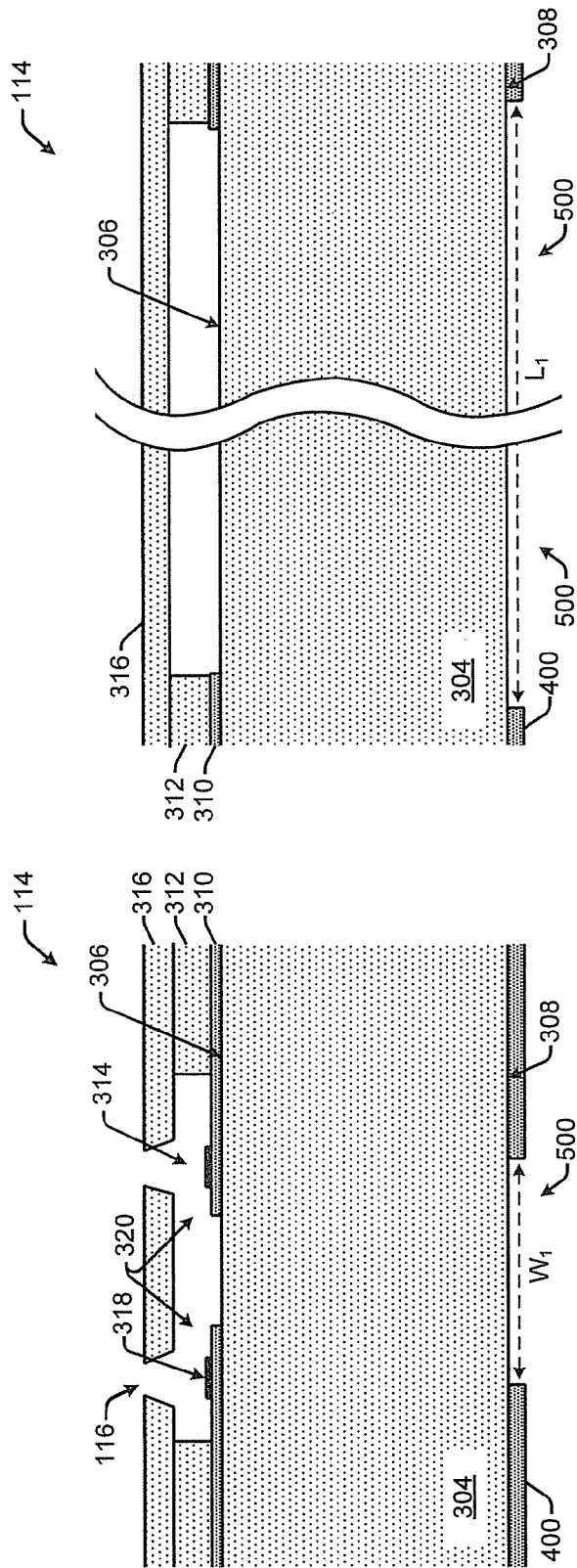

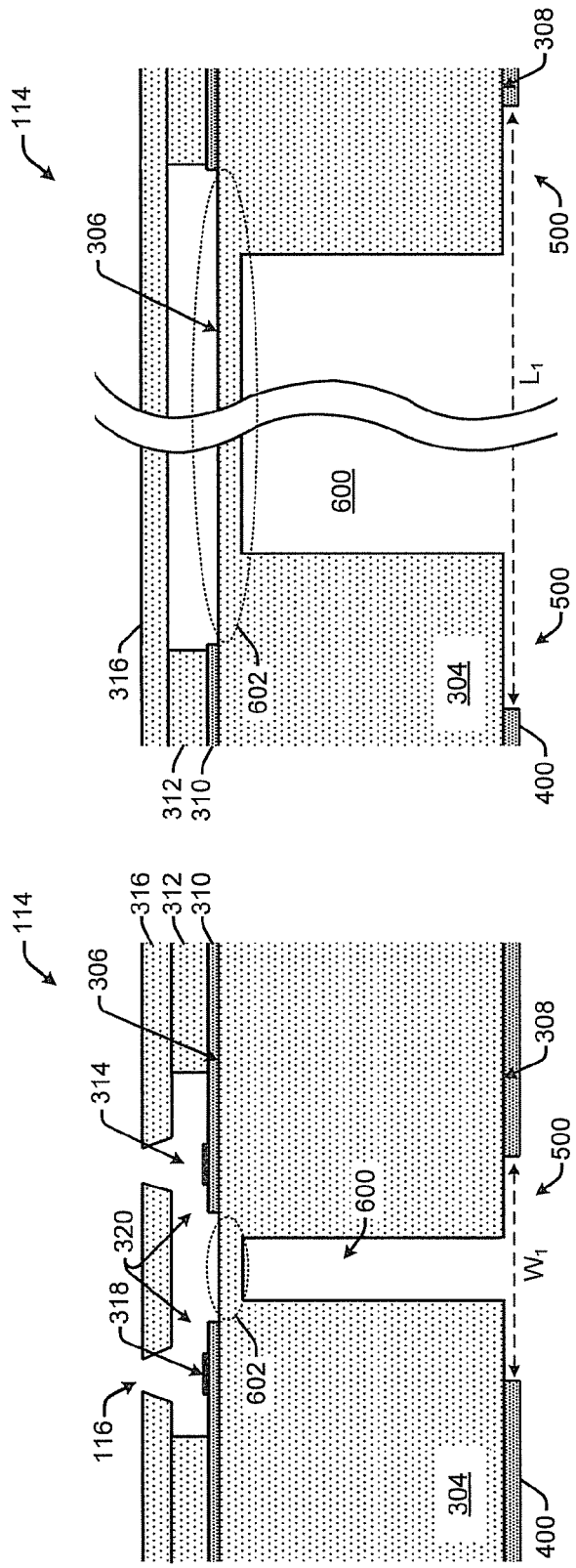

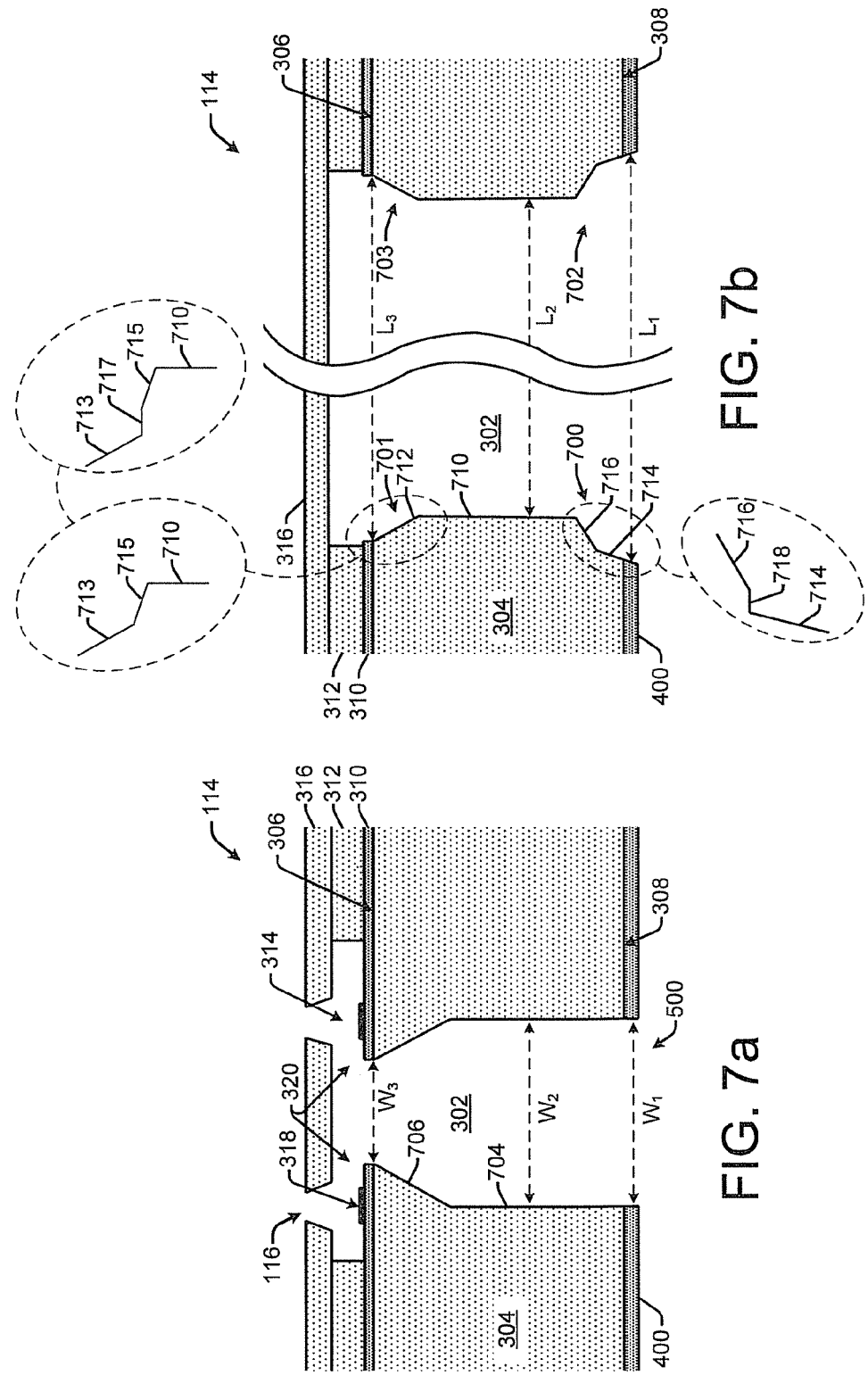

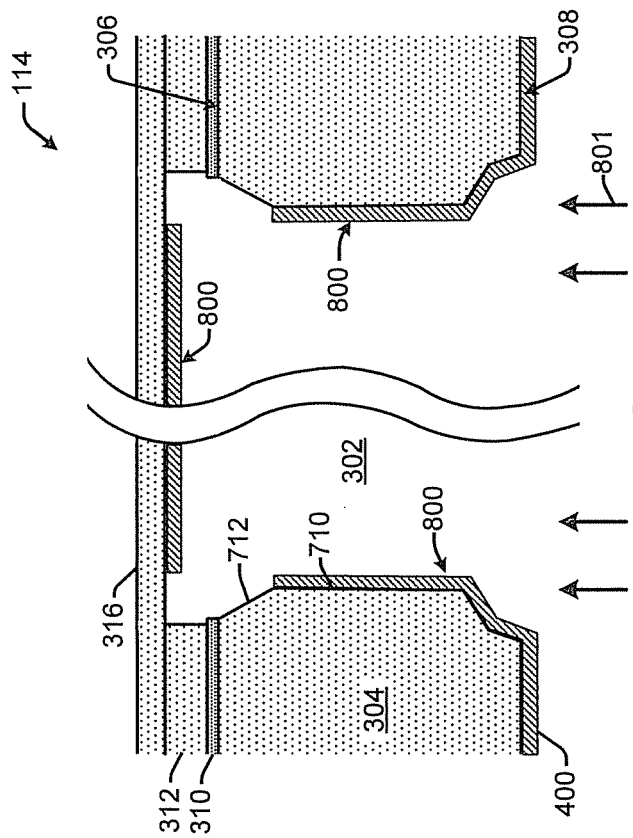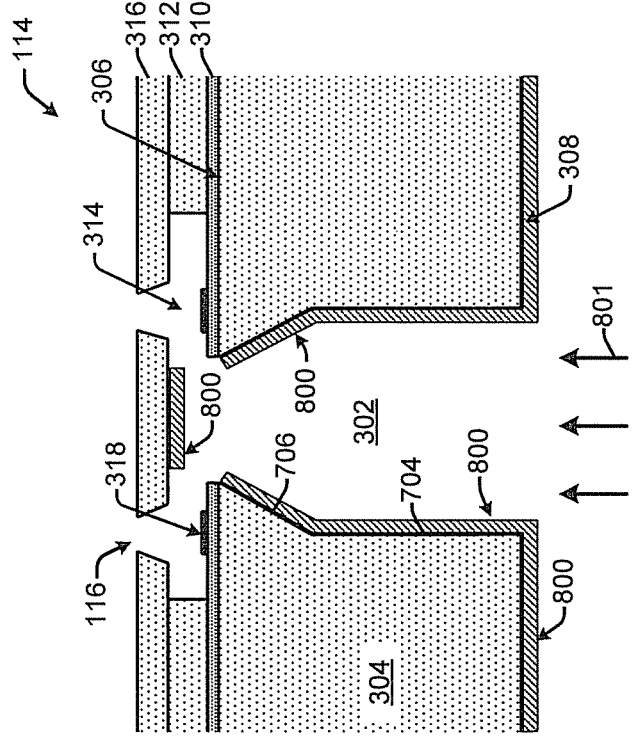

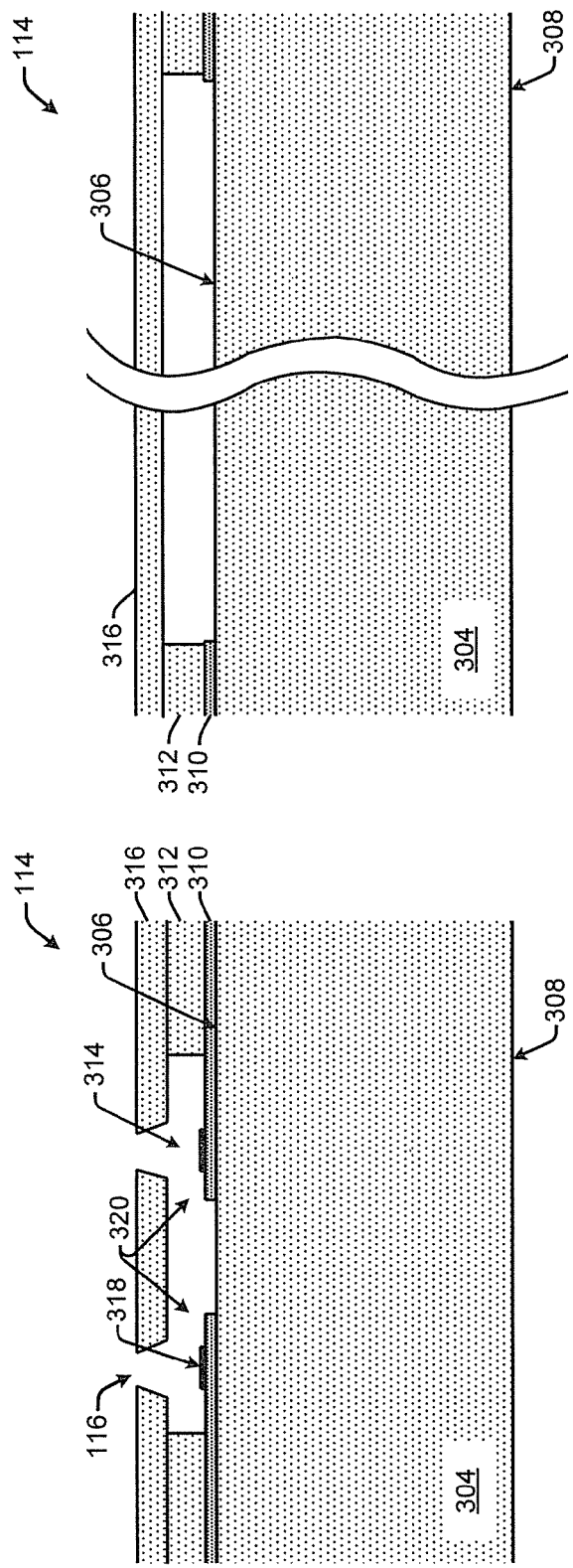

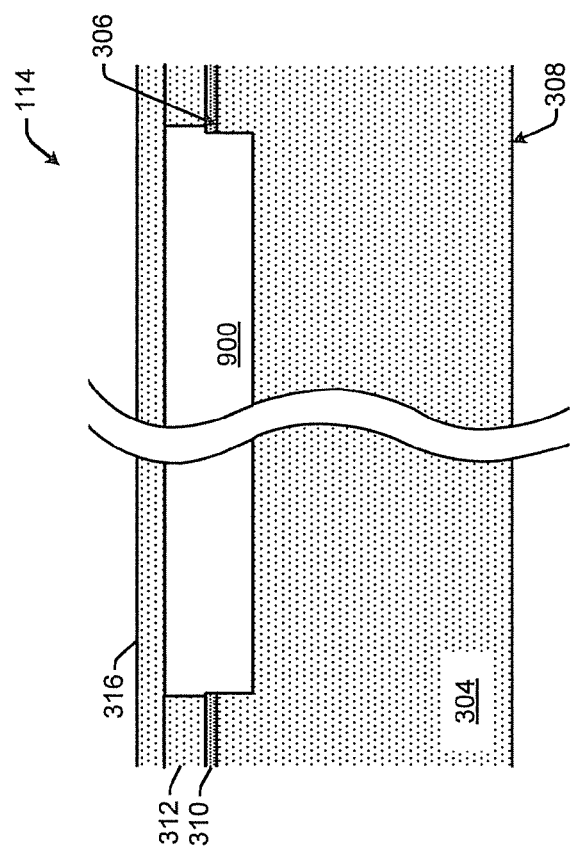
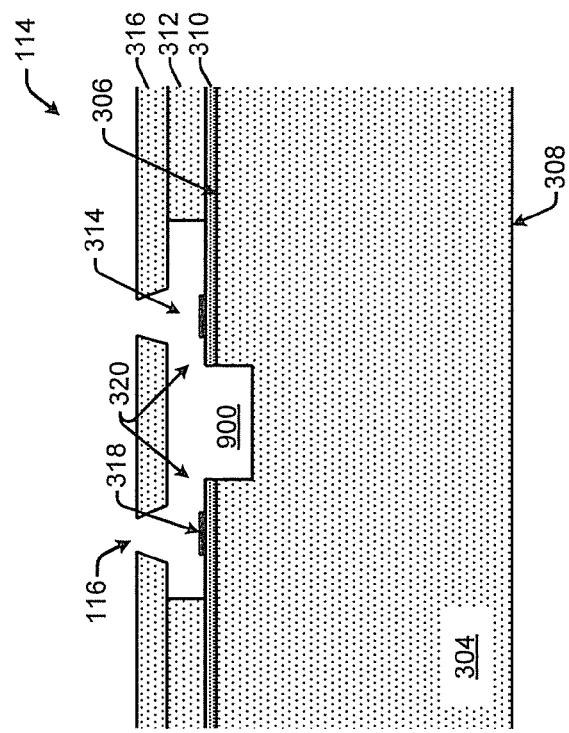
FIG. 10a
FIG. 10b

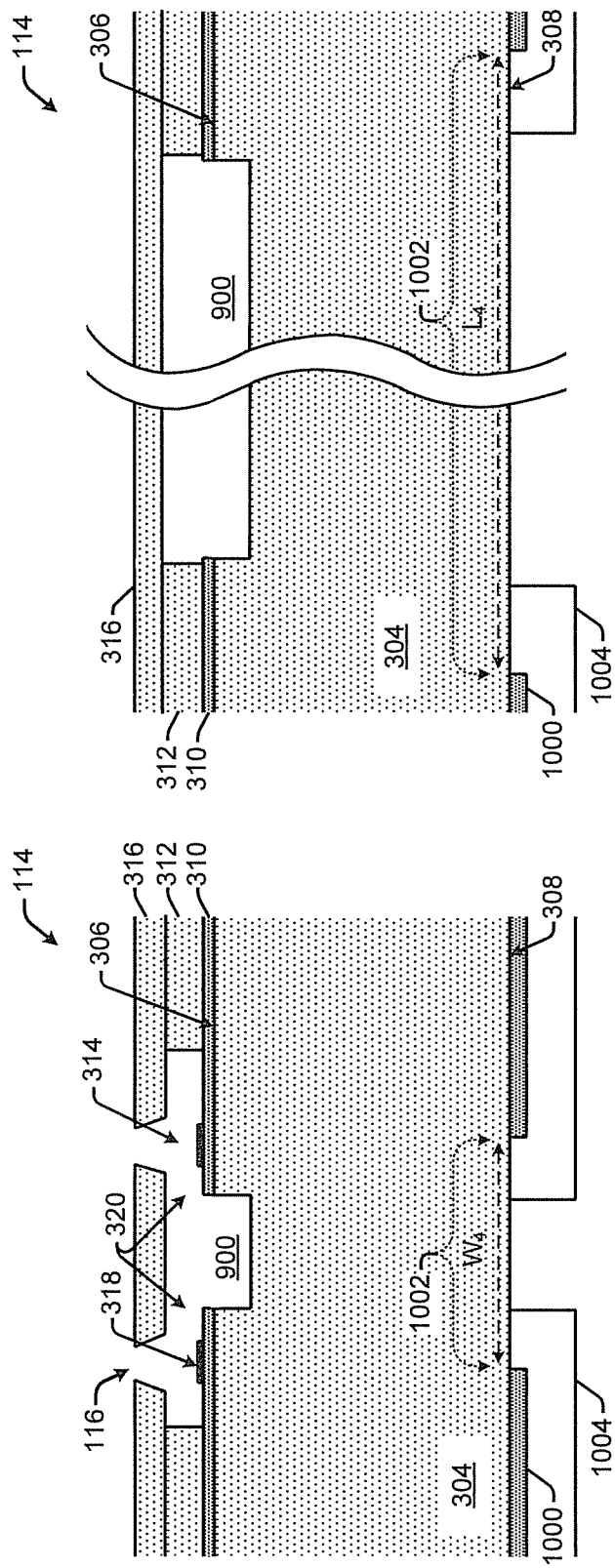

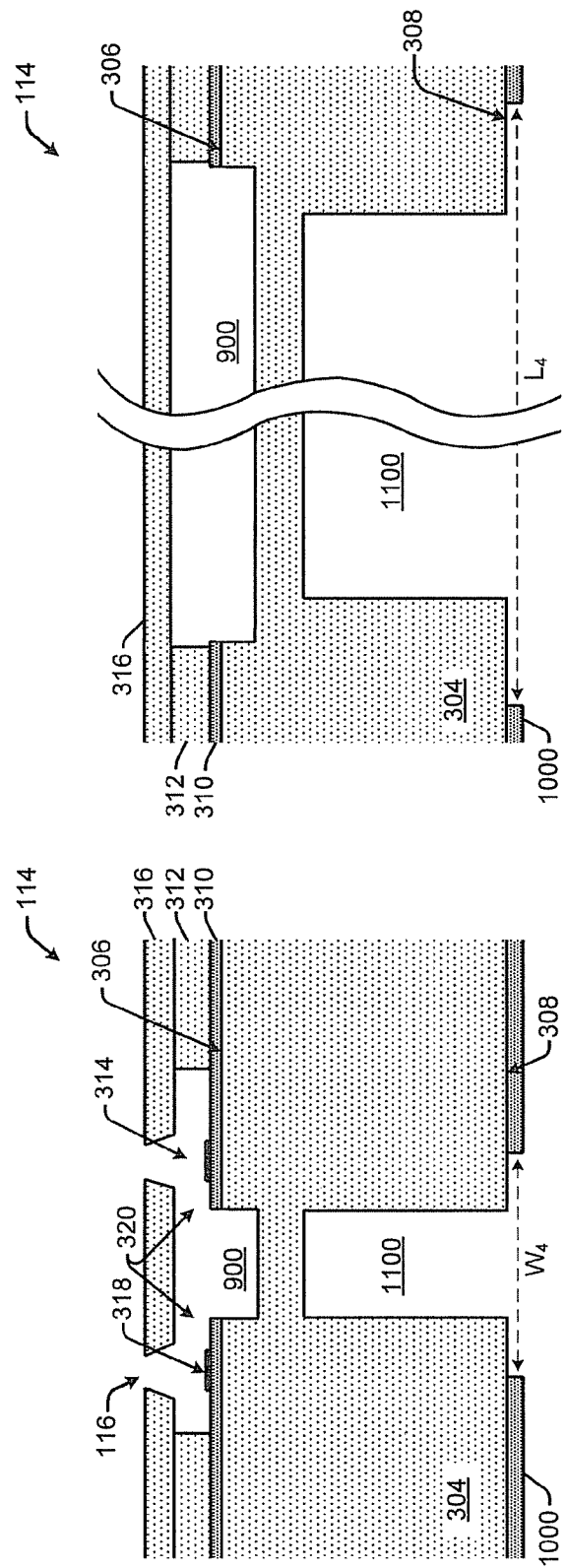

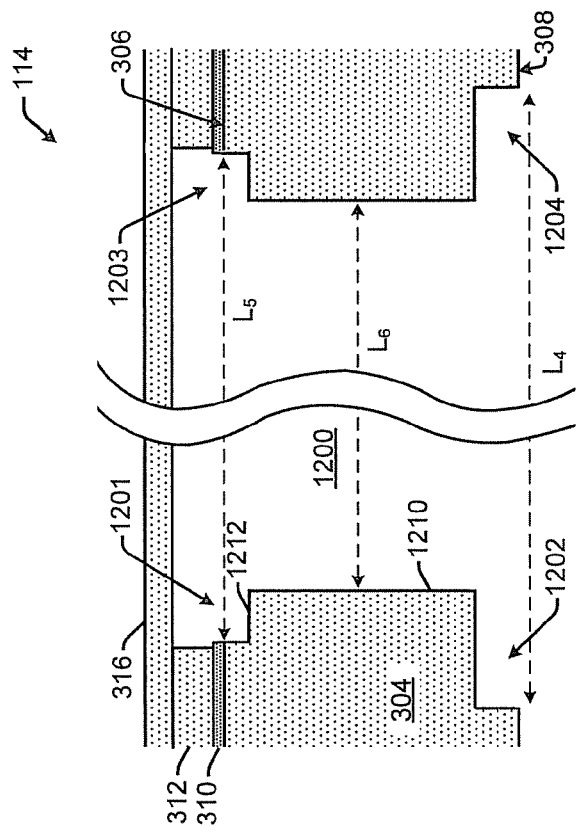
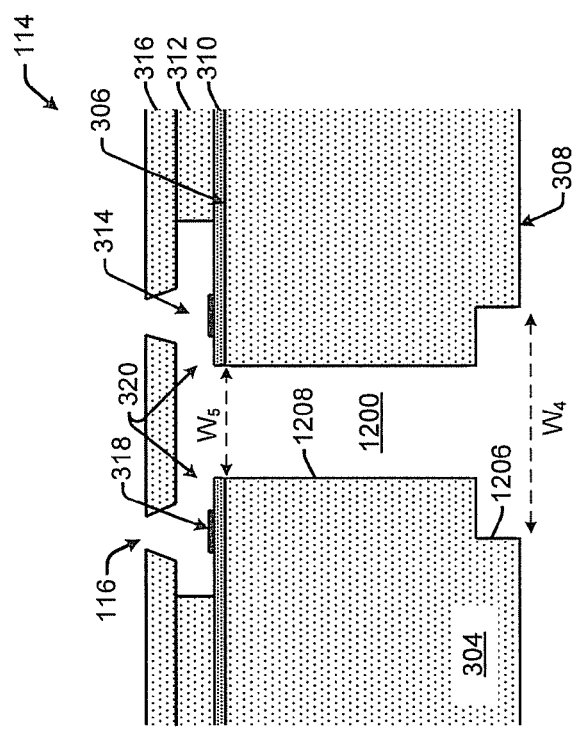
FIG. 13b
FIG. 13a

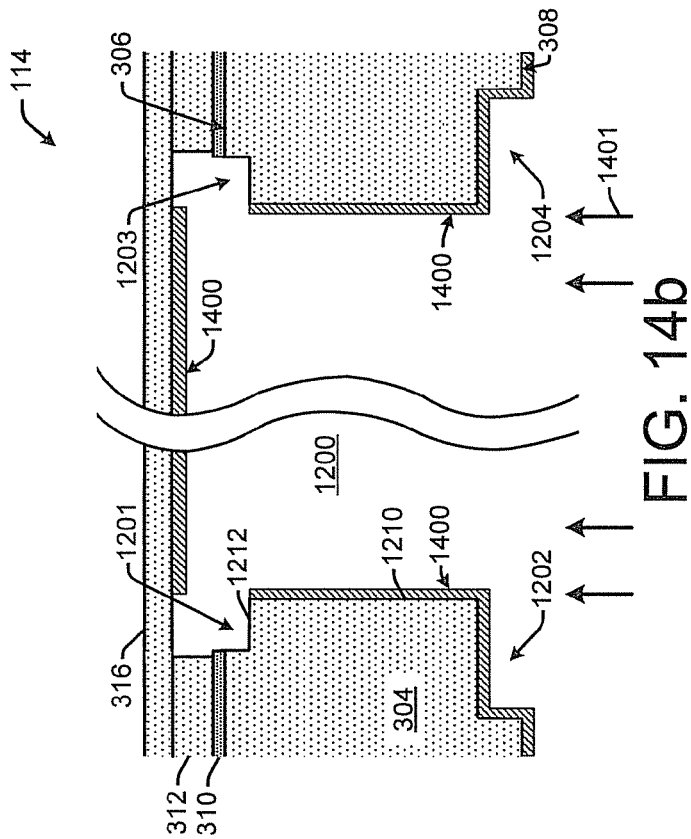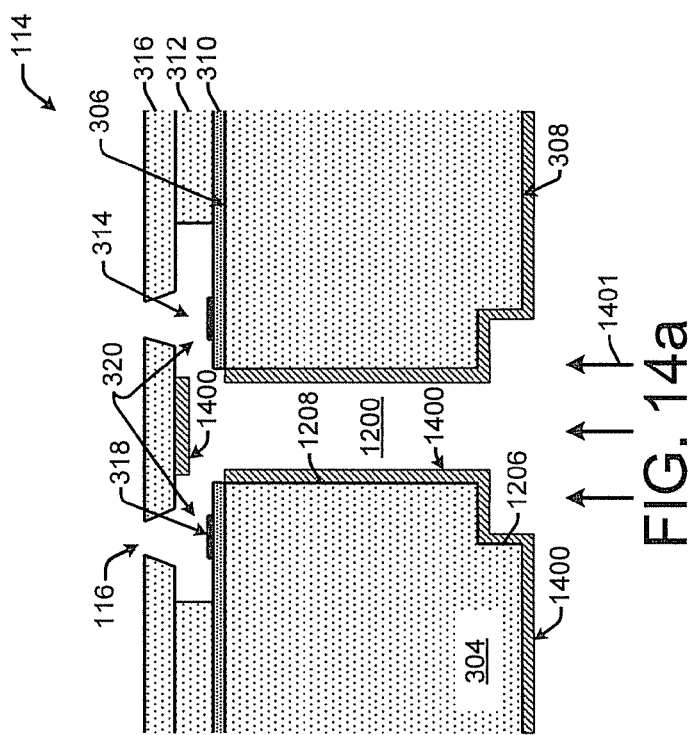

FLUID EJECTION DEVICE

BACKGROUND

Fluid ejection devices, such as printheads in inkjet printing systems, may use thermal resistors or piezoelectric material membranes as actuators within fluidic chambers to eject fluid drops (e.g., ink) from nozzles. In either case, fluid flows from a reservoir into the fluidic chambers through a fluid slot that extends through a substrate on which the chambers and actuators are generally formed.

With the substrate formed of silicon, however, interaction of the ink with the substrate may lead to etching of the silicon and the subsequent formation of silicate rings in the nozzles or silicate kogation on the resistors. Etching of the silicon by the ink may also lead to the formation of flaws in the substrate which may weaken the substrate and result in silicon fracture.

BRIEF DESCRIPTION OF THE DRAWINGS

FIGS. 4a-4b, 5a-5b, 6a-6b, 7a-7b, and 8a-8b schematically illustrate one example of forming a substrate for a printhead implemented as an example of a fluid ejection device.

FIGS. 9a-9b, 10a-10b, 11a-11b, 12a-12b, 13a-13b, and 14a-14b schematically illustrate another example of forming a substrate for a printhead implemented as an example of a fluid ejection device.

DETAILED DESCRIPTION

In the following detailed description, reference is made to the accompanying drawings which form a part hereof, and in which is shown by way of illustration specific examples in which the disclosure may be practiced. In this regard, directional terminology, such as "top," "bottom," "front," "back," "leading," "trailing," etc., is used with reference to the orientation of the Figure(s) being described. Because components of examples of the present disclosure can be positioned in a number of different orientations, the directional terminology is used for purposes of illustration and is in no way limiting. It is to be understood that other examples may be utilized and structural or logical changes may be made without departing from the scope of the present disclosure. The following detailed description, therefore, is not to be taken in a limiting sense, and the scope of the present disclosure is defined by the appended claims.

In general, printhead features such as fluid drop ejection actuators (e.g., thermal resistors, piezoelectric membranes), fluidic firing chambers, and fluidic channels (e.g., fluid slots) that route fluid from fluid supply reservoirs to the firing chambers, are fabricated on or in a substrate using a mixture of integrated circuit and MEMS techniques. The present disclosure provides methods of fabrication that result in a printhead substrate with increased strength. The methods of fabrication help reduce cracks in the substrate, and improve printhead fabrication line yield and overall product reliability in fluid ejection systems such as inkjet printers.

Figure 1:
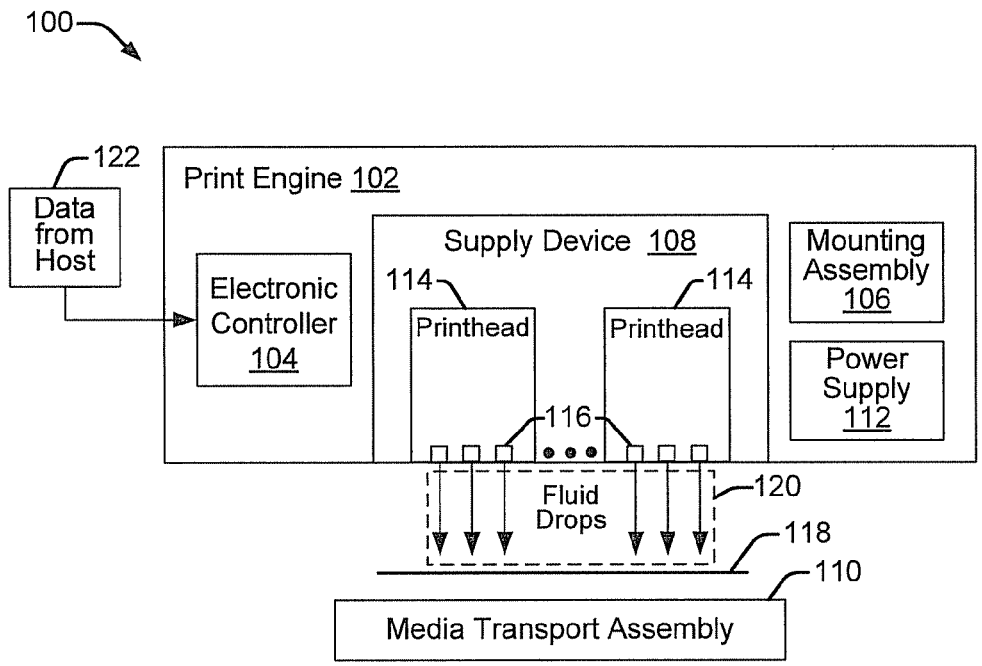
FIG. 1 is a block diagram illustrating one example of an inkjet printing system including a printhead implemented as an example of a fluid ejection device.

FIG. 1 is a block diagram illustrating one example of an inkjet printing system 100. In the illustrated example, inkjet printing system 100 includes a print engine 102 having a controller 104, a mounting assembly 106, one or more replaceable fluid supply devices 108 (e.g., print cartridges), a media transport assembly 110, and at least one power supply 112 that provides power to the various electrical components of inkjet printing system 100. Inkjet printing system 100 further includes one or more printheads 114 (i.e., fluid ejection devices) that eject droplets of ink or other fluid through a plurality of nozzles 116 (also referred to as orifices or bores) toward print media 118 so as to print onto print media 118. In one example, printhead 114 may be an integral part of an ink cartridge supply device 108, while in another example, printhead 114 may be mounted on a print bar (not shown) of mounting assembly 106 and coupled to a supply device 108 (e.g., via a tube). Print media 118 can be any type of suitable sheet or roll material, such as paper, card stock, transparencies, Mylar, polyester, plywood, foam board, fabric, canvas, and the like.

In one example, as discussed below and illustrated herein, printhead 114 comprises a thermal inkjet (TIJ) printhead that ejects fluid drops from nozzle 116 by passing electrical current through a thermal resistor ejection element to generate heat and vaporize a small portion of the fluid within a firing chamber. Printhead 114, however, is not limited to being implemented as a TIJ printhead. For example, printhead 114 can be implemented as a piezoelectric inkjet (PIJ) printhead that uses a piezoelectric material ejection element to generate pressure pulses to force fluid drops out of nozzle 116. In either example, nozzles 116 are typically arranged in one or more columns or arrays along printhead 114 such that properly sequenced ejection of ink from the nozzles causes characters, symbols, and/or other graphics or images to be printed on print media 118 as printhead 114 and print media 118 are moved relative to each other.

Mounting assembly 106 positions printhead 114 relative to media transport assembly 110, and media transport assembly 110 positions print media 118 relative to printhead 114. Thus, a print zone 120 is defined adjacent to nozzles 116 in an area between printhead 114 and print media 118. In one example, print engine 102 is a scanning type print engine. As such, mounting assembly 106 includes a carriage for moving printhead 114 relative to media transport assembly 110 to scan print media 118. In another example, print engine 102 is a non-scanning type print engine. As such, mounting assembly 106 fixes printhead 114 at a prescribed position relative to media transport assembly 110 while media transport assembly 110 positions print media 118 relative to printhead 114.

Electronic controller 104 typically includes components of a standard computing system such as a processor, memory, firmware, and other printer electronics for communicating with and controlling supply device 108, printhead(s) 114, mounting assembly 106, and media transport assembly 110. Electronic controller 104 receives data 122 from a host system, such as a computer, and temporarily stores the data 122 in a memory. Data 122 represents, for example, a document and/or file to be printed. As such, data 122 forms a print job for inkjet printing system 100 that includes one or more print job commands and/or command parameters. Using data 122, electronic controller 104 controls printhead 114 to eject ink drops from nozzles 116 in a defined pattern that forms characters, symbols, and/or other graphics or images on print medium 118.

Figure 2:
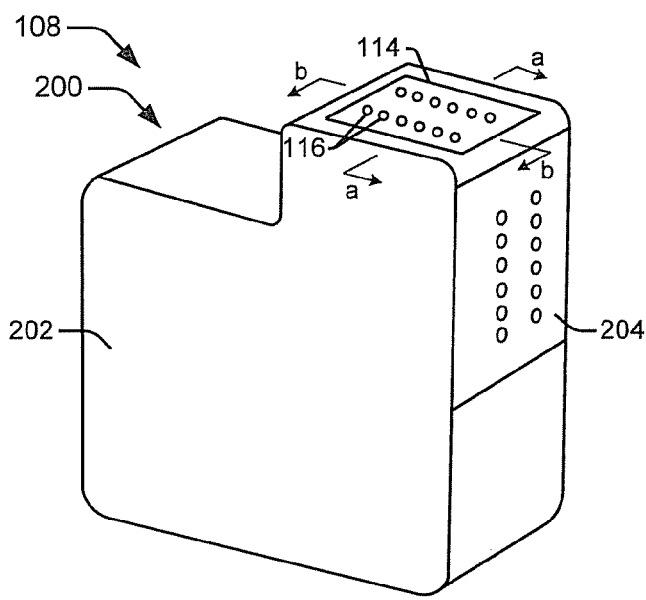
FIG. 2 is a schematic illustration of one example of a print cartridge implemented as an example of a fluid supply device for use in an inkjet printing system.

FIG. 2 is a schematic illustration of one example of a print cartridge 200 implemented as an example of fluid supply device 108 for use in inkjet printing system 100. Print cartridge 200 includes a cartridge body 202, printhead 114, and electrical contacts 204. Cartridge body 200 supports printhead 114 and electrical contacts 204 through which electrical signals are provided to activate ejection elements (e.g., resistive heating elements) that eject fluid drops from select nozzles 116. Fluid within cartridge 200 can be any suitable fluid used in a printing process, such as various printable fluids, inks, pre-treatment compositions, fixers, and the like. In some examples, the fluid can be a fluid other than a printing fluid. Cartridge 200 may contain a fluid supply within cartridge body 200, but may also receive fluid from an external supply (not shown) such as a fluid reservoir connected through a tube, for example.

Figure 3:
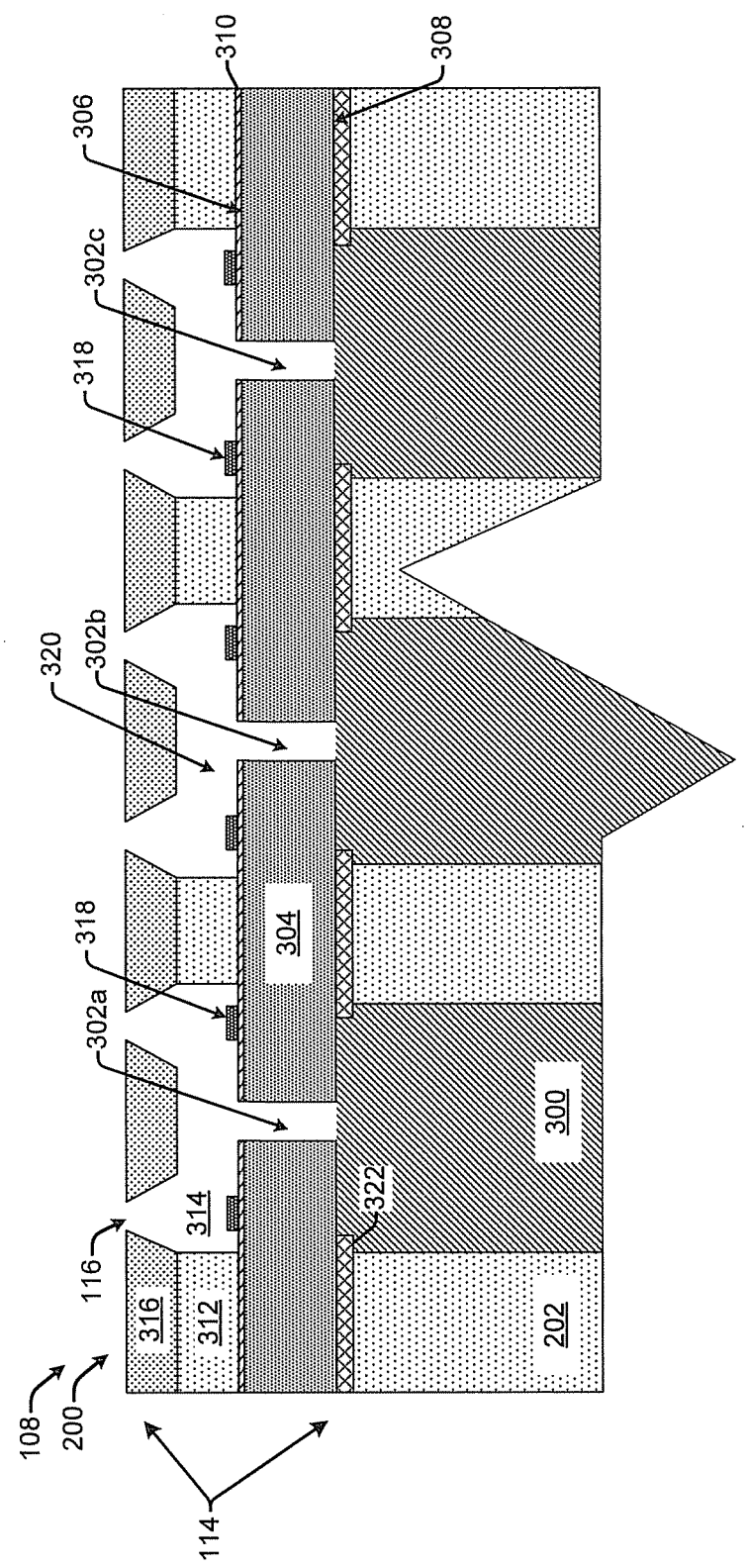
FIG. 3 is a schematic cross-sectional view illustrating one example of a portion of the print cartridge of FIG. 2.

FIG. 3 is a schematic cross-sectional view illustrating one example of a portion of print cartridge 200 of FIG. 2 implemented as an example of fluid supply device 108. Cartridge body 202 contains fluid 300 for supply to printhead 114. In the illustrated example, print cartridge 200 supplies one color of fluid or ink to printhead 114. However, in other implementations, other print cartridges can supply multiple colors and/or black ink to a single printhead. In the illustrated example, schematically-illustrated fluid-feed or fluid-handling slots 302a, 302b, and 302c pass through printhead substrate 304. While three fluid-feed slots are shown, a greater or lesser number of fluid-feed slots may be used in different printhead implementations.

In one example, substrate 304 is formed of silicon and, in some implementations, may comprise a crystalline substrate such as doped or non-doped monocrystalline silicon or doped or non-doped polycrystalline silicon. Other examples of suitable substrates include gallium arsenide, gallium phosphide, indium phosphide, glass, silica, ceramics, or a semiconducting material. Substrate 304 may be between 100 and 2000 microns thick and, in one implementation, is approximately 675 microns thick. Substrate 304 has a first or front-side surface 306 and a second or back-side surface 308 opposite front-side surface 306. In one example, an adhesive layer 322 joins substrate 304 at back-side surface 308 to cartridge body 202. In addition, a thin-film structure 310, including one or more thin-film layers such as, for example, a field or thermal oxide layer, is formed on front-side surface 306.

In one example, a barrier layer 312 is formed over thin-film structure 310, and at least partially defines firing or fluid ejection chambers 314. Barrier layer 312 may be formed, for example, of a photo-imageable epoxy. Over barrier layer 312 is an orifice plate or nozzle plate 316 having nozzles 116 through which fluid is ejected. Orifice plate 316 may be formed, for example, of a photo-imageable epoxy or a nickel substrate. In some implementations, orifice plate 316 is the same material as barrier layer 312 and, in some implementations, orifice plate 316 and barrier layer 312 may be integral.

Within each fluid ejection chamber 314 and surrounded by barrier layer 312, is an independently controllable fluid ejection element 318. In the illustrated example, fluid ejection elements 318 comprise thermal firing resistors. When an electrical current is passed through a resistor in a respective fluid ejection chamber 314, a portion of the fluid is heated to its boiling point so that it expands to eject another portion of the fluid through nozzle 116. The ejected fluid is then replaced by additional fluid from a fluid-handling passageway 320 and fluid-handling slot 302. As noted above, in different implementations, fluid ejection elements can comprise piezoelectric material ejection elements (i.e., actuators).

FIGS. 4a-4b, 5a-5b, 6a-6b, 7a-7b, and 8a-8b schematically illustrate one example of forming substrate 304 of printhead 114. FIGS. 4a and 4b show partial cross-sectional views of a portion of printhead 114 of print cartridge 200 taken along lines a-a and b-b in FIG. 2. More specifically, FIG. 4a shows the cross-sectional view along line a-a, which is a short axis profile or view of printhead 114, while FIG. 4b shows the cross-sectional view along line b-b, which is a long axis profile or view of printhead 114. The long axis view shown in FIG. 4b is facilitated by the break lines drawn through the middle of the view (i.e., the open wavy lines with blank space in between), which are intended to indicate that the length of the long axis profile or view is proportionally greater than it appears in the figure. This also applies to subsequent figures showing the long axis profile or view.

As shown in FIGS. 4a and 4b, initial steps in one example process of forming fluid-handling or fluid-feed openings or slots in printhead 114 include processing front-side surface 306 and back-side surface 308 of substrate 304. This processing includes forming thin film structure 310, barrier layer 312, orifice layer 316 with nozzles 116, chambers 314 with ejection elements 318, and fluid passageways 320 on front-side surface 306 of substrate 304. In addition, a masking layer 400 is formed over back-side surface 308 of substrate 304.

In one example, masking layer 400 includes a hard mask made of a material that is resistant to etching environments and that will not be removed by chemicals used to remove substrate material (e.g., silicon) during the slot forming process. For example, the hard mask can be a grown thermal oxide, or a grown or deposited dielectric material such as CVD (chemical vapor deposition) oxides, silicon oxide formed with a TEOS precursor (tetraethoxysilane), silicon carbide, silicon nitride, and/or other suitable materials such as aluminum, tantalum, copper, aluminum-copper alloys, aluminum-titanium alloys, and gold.

FIGS. 5a and 5b show additional steps in one example process of forming fluid-handling or fluid-feed openings or slots in printhead 114. More specifically, FIG. 5a shows the cross-sectional, short axis profile or view of printhead 114 taken along line a-a of FIG. 2, while FIG. 5b shows the cross-sectional, long axis profile or view of printhead 114 taken along line b-b of FIG. 2. As shown in FIGS. 5a and 5b, masking layer 400 is patterned to create an exposed area 500 of back-side surface 308 of substrate 304. In one example, masking layer 400 is patterned using a laser machining process. Other patterning processes, however, may also be used, such as a photolithographic process with a dry or wet etch to remove the hard mask material. In one implementation, exposed area 500 of back-side surface 308 has a width W1 that corresponds with the short axis of printhead 114 shown in FIG. 5a, and a length L1 that corresponds with the long axis of printhead 114 shown in FIG. 5b.

Referring additionally to FIGS. 7a and 7b, width W1 of exposed area 500 corresponds with a width W2 of a desired slot 302 as shown in FIG. 7a. In other implementations, width W1 of exposed area 500 can be greater than width W2 of a desired slot 302. In some implementations, width W1 may be in a range of approximately 100 to approximately 1000 microns. As noted below, and as illustrated in FIG. 7a, slot 302 has a width W3 at front-side surface 306. In one implementation, length L1 of exposed area 500 corresponds to a length that is greater than a length L2 of a desired slot 302 as shown in FIG. 7b. More specifically, length L1 of exposed area 500 is longer than length L2 of a desired slot 302 such that length L1 extends beyond length L2 of slot 302. As noted below, the additional length of length L1 of exposed area 500 beyond length L2 of slot 302 facilitates the formation of recessed regions in back-side surface 308 of substrate 304 at the ends of slot 302 in a subsequent etching process. Thus, in one example, exposed area 500 encompasses length L2 and width W2 of slot 302, as well as recessed regions at both ends of slot 302. As also noted below, and as illustrated in FIG. 7b, slot 302 has a length L3 at front-side surface 306.

FIGS. 6a and 6b show additional steps in one example process of forming fluid-handling or fluid-feed openings or slots in printhead 114. More specifically, FIG. 6a shows the cross-sectional, short axis profile or view of printhead 114 taken along line a-a of FIG. 2, while FIG. 6b shows the cross-sectional, long axis profile or view of printhead 114 taken along line b-b of FIG. 2. As shown in FIGS. 6a and 6b, substrate material (e.g., silicon) is removed at back-side surface 308 to form a trench 600 (i.e., which is a portion of the slot) in substrate 304.

In one implementation, trench 600 is formed using a laser machining process. Other techniques for forming trench 600 include, for example, a silicon dry etch such as a plasma enhanced reactive ion etch (RIE) with alternating sulfur hexafluoride (SF6) etching and octafluorobutene (C4F8) deposition, sand drilling and mechanically contacting the substrate material. Mechanically contacting can include, for example, sawing with a diamond abrasive blade. Trench 600 is formed through less than the entire thickness of substrate 304, thereby leaving a membrane 602 (e.g., a silicon membrane) to protect thin-film structure 310 from the potentially damaging effects of the laser beam or other trench formation processes.

FIGS. 7a and 7b show additional steps in one example process of forming fluid-handling or fluid-feed openings or slots in printhead 114. More specifically, FIG. 7a shows the cross-sectional, short axis profile or view of printhead 114 taken along line a-a of FIG. 2, while FIG. 7b shows the cross-sectional, long axis profile or view of printhead 114 taken along line b-b of FIG. 2. As shown in FIGS. 7a and 7b, additional substrate material is removed from within trench 600 (FIGS. 6a, 6b) to form slot 302 all the way through substrate 304 from back-side surface 308 to front-side surface 306. In addition, as shown in the long axis profile or view of FIG. 7b, substrate material is removed from portions of exposed area 500 (FIGS. 6a, 6b) that extend beyond the ends of slot 302 to form recessed regions 700 and 702 in back-side surface 308 of substrate 304 at the ends of slot 302. As shown in FIG. 7b, recessed regions 700 and 702 extend beyond length L2 of slot 302. As also shown in the long axis profile or view of FIG. 7b, and as further described below, recessed regions 701 and 703 are formed in front-side surface 306 of substrate 304 at the ends of slot 302.

In one implementation, the removal of additional substrate material to form slot 302 through substrate 304 is achieved using an anisotropic wet etch process. Wet etching is achieved by immersing substrate 304 in an anisotropic etchant for a period of time sufficient to form slot 302 and recessed regions 700, 702 and 701, 703 at the slot ends. In one implementation, substrate 302 can be immersed in an etchant such as TMAH (TetramethylamoniumHydroxide) or KOH (potassium hydroxide). Etchants can include any anisotropic wet etchant that has selectivity to hard masks and exposed thin-film and other layers. In one implementation, a single instance of wet etching is used to remove the additional substrate material and form slot 302 and recessed regions 700, 702 and 701, 703. In other implementations, the etching can include multiple instances of wet etching.

Slot 302 is generally defined by sidewalls that are substantially symmetrical from one side to the other side as shown in the short axis profile or view of FIG. 7a, and substantially symmetrical from one end to the other end as shown in the long axis profile or view of FIG. 7b. As shown in FIG. 7a, sidewalls in the short axis profile or view include a lower portion 704 that is communicated with back-side surface 308 and substantially perpendicular to front-side surface 306 and back-side surface 308, and an upper portion 706 that is communicated with and oriented at angle to front-side surface 306. In one example, lower portion 704 of the short axis sidewalls comprises the <110> plane of the silicon substrate which etches the fastest in the anisotropic wet etch, and upper portion 706 of the short axis sidewalls comprises the <111> plane of the silicon substrate which etches more slowly than the <110> plane in the anisotropic wet etch thereby resulting in the angled portion.

As shown in FIG. 7b, sidewalls in the long axis profile or view include a middle portion 710 that is substantially perpendicular to front-side surface 306 and back-side surface 308, an upper portion 712 that is communicated with and oriented at angle to front-side surface 306, and recessed regions 700 and 702 that are communicated with back-side surface 308. In one example, upper portion 712 of the long axis sidewalls includes recessed regions 701 and 703 that are communicated with front-side surface 306. In one example, middle portion 710 of the long axis sidewalls comprises the <110> plane of the silicon substrate which etches the fastest in the anisotropic wet etch, and recessed regions 701 and 703 of upper portion 712 of the long axis sidewalls comprise the <111> plane of the silicon substrate which etches more slowly than the <110> plane in the anisotropic wet etch thereby resulting in the angled portion.

In other examples, such as that shown in the dotted line cutouts of FIG. 7b, additional variations are possible for the planar configuration of recessed regions 701 and 703. For example, as shown in one of the dotted line cutouts, recessed regions 701 and 703 include a first portion or plane 713 comprising the <111> plane of the silicon substrate which etches more slowly than the <110> plane 710, and a second portion or plane 715 comprising the <311> plane of the silicon substrate which forms as the dimension of L3 increases relative to dimension L2 for a defined etch time. In another example, as shown in another of the dotted line cutouts, a <100> horizontal plane 717 is formed between the first and second planes 713 and 715 of the recessed regions as dimension L3 further increases relative to dimension L2.

In one example, sidewalls of slot 302 in the long axis view also include recessed regions 700 and 702 at back-side surface 308. As shown in FIG. 7b, recessed regions 700 and 702 at the ends of slot 302 include differently angled portions or planes. In one example, a first portion or plane 714 of recessed regions 700 and 702 is steeply angled and comprises the <111> plane of the silicon substrate which etches more slowly than the <110> plane 710. A second portion or plane 716 of recessed regions 700 and 702 has a lower angle and comprises the <311> plane of the silicon substrate which etches the slowest in the anisotropic wet etch. The <311> plane is formed due to the non isotropic etch proceeding from the adjacent <110> plane 710.

In other examples, such as that shown in the dotted line cutout of FIG. 7b, additional variations are possible for the planar configuration of recessed regions 700 and 702. For example, as shown in the dotted line cutout, a <100> horizontal plane 718 is formed between the first and second planes 714 and 716 of the recessed regions. These etch features are formed during the fabrication of the slot by the relationship dimension of the width of masking layer 400 relative to the laser machined location and the wet etch time.

In one example, upper portion 706 forms a first portion of a short axis profile of slot 302 in the short axis view of FIG. 7a, and lower portion 704 forms a second portion of a short axis profile of slot 302 in the short axis view of FIG. 7a. In addition, upper portion 712 (including recessed regions 701 and 703) forms a first portion of a long axis profile of slot 302 in the long axis view of FIG. 7b, and recessed regions 700 and 702 and middle portion 710 form a second portion of a long axis profile of slot 302 in the long axis view of FIG. 7b. As such, the first portion of the short axis profile of slot 302 (i.e., upper portion 706) converges from the second portion of the short axis profile of slot 302 to front-side surface 306 such that a minimum dimension (i.e., width W3) of the first portion of the short axis profile of slot 302 is defined at front-side surface 306. In addition, the first portion of the long axis profile of slot 302 (i.e., upper portion 712) diverges from the second portion of the long axis profile of slot 302 to front-side surface 306 such that a maximum dimension (i.e., length L3) of the first portion of the long axis profile of slot 302 is defined at front-side surface 306. Furthermore, a minimum dimension (i.e., length L2) of the long axis profile of slot 302 is defined by middle portion 710.

FIGS. 8a and 8b show additional steps in one example process of forming fluid-handling or fluid-feed openings or slots in printhead 114. More specifically, FIG. 8a shows the cross-sectional, short axis profile or view of printhead 114 taken along line a-a of FIG. 2, while FIG. 8b shows the cross-sectional, long axis profile or view of printhead 114 taken along line b-b of FIG. 2. As shown in FIGS. 8a and 8b, after slot 302 is formed through substrate 304 and masking layer 400 is removed from back-side surface 308, a protective coating or layer 800 is formed on sidewalls of slot 302 in the short axis view and the long axis view. More specifically, protective layer 800 is formed on lower portion 704 and upper portion 706 of the short axis sidewalls, and formed on recessed regions 700 and 702 and middle portion 710 of the long axis sidewalls. As shown in FIG. 8b, however, protective layer 800 is excluded from or not provided on upper portion 712 of the long axis sidewalls, as further described below. In one example, as also shown in FIGS. 8a and 8b, protective layer 800 is also formed on back-side surface 308 and on an underside (i.e., chamber-side) of nozzle plate 316. In another example, however, protective layer 800 is excluded from or not formed on back-side surface 308.

Protective layer 800 may be formed of metals, or ceramic materials such as oxides, nitrides, carbides, borides, and mixtures thereof. In one example, protective layer 800 is a metal film. Examples of metals that may be utilized are tantalum, tungsten, molybdenum, titanium, gold, rhodium, palladium, platinum, niobium, nickel or combinations thereof. In other examples, protective layer 800 may be formed from silicon nitride, silicon carbide, tungsten carbide, titanium nitride, and molybdenum boride. Additionally, the surface of protective layer 800 may form a native oxide. For example, tantalum may form a tantalum oxide at the exterior surface.

In one example, protective layer 800 is formed by physical vapor deposition (PVD). In one implementation, material of protective layer 800 is deposited using self-ionized plasma (SIP) physical vapor deposition whereby the substrate is oriented parallel with the target material and the back-side surface of the substrate, including the slots, faces the deposition material. More specifically, protective layer 800 is formed by directionally depositing material of protective layer 800 from back-side surface 308 toward front-side surface 306, as represented by arrows 801. As such, the directionally deposited material of protective layer 800 coats the first and second portions of the short axis profile of slot 302 (e.g., upper portion 706 and lower portion 704), and coats the second portion of the long axis profile of slot 302 (e.g., recessed regions 700 and 702 and middle portion 710).

As the first portion of the long axis profile of slot 302 (i.e., upper portion 712) is "recessed" (e.g., recessed regions 701 and 703) relative to the second portion of the long axis profile of slot 302 (viz., middle portion 710), the directionally deposited material of protective layer 800 does not coat the first portion of the long axis profile of slot 302 (i.e., does not coat recessed regions 701 and 703 of upper portion 712) since the first portion of the long axis profile of slot 302 is not "exposed" to the directional deposition. Accordingly, depositing of the protective material and, therefore, formation of protective layer 800 is excluded from upper portion 712 of the long axis profile of slot 302. In one example, with the directional depositing of material for protective layer 800 from back-side surface 308 toward front-side surface 306, protective layer 800 is also formed on back-side surface 308 and on an underside (i.e., chamber-side) of nozzle plate 316. Protective layer 800, however, may be excluded from or not formed on back-side surface 308.

FIGS. 9a-9b, 10a-10b, 11a-11b, 12a-12b, 13a-13b, and 14a-14b schematically illustrate another example of forming substrate 304 of printhead 114. FIGS. 9a and 9b show partial cross-sectional views of a portion of printhead 114 of print cartridge 200 taken along lines a-a and b-b in FIG. 2. More specifically, FIG. 9a shows the cross-sectional view along line a-a, which is a short axis profile or view of printhead 114, while FIG. 9b shows the cross-sectional view along line b-b, which is a long axis profile or view of printhead 114.

As shown in FIGS. 9a and 9b, initial steps in one example process of forming fluid-handling or fluid-feed openings or slots in printhead 114 include processing front-side surface 306 of substrate 304. This processing is similar to that described above with reference to FIGS. 4a and 4b, and includes forming thin-film structure 310, barrier layer 312, orifice layer 316 with nozzles 116, chambers 314 with ejection elements 318, and fluid passageways 320 on front-side surface 306 of substrate 304. Unlike the implementation above for FIGS. 4a and 4b, however, the implementation shown in FIGS. 9a and 9b does not include forming a wet etch masking layer over back-side surface 308 of substrate 304.

FIGS. 10a and 10b show additional steps in one example process of forming fluid-handling or fluid-feed openings or slots in printhead 114. More specifically, FIG. 10a shows the cross-sectional, short axis profile or view of printhead 114 taken along line a-a of FIG. 2, while FIG. 10b shows the cross-sectional, long axis profile or view of printhead 114 taken along line b-b of FIG. 2. In one example, as shown in FIGS. 10a and 10b, a dry etch process is performed to remove material from substrate 304 (i.e., to remove silicon), and form a trench 900 in front-side surface 306 of substrate 304. A suitable dry etch process includes a silicon dry etch such as a plasma enhanced reactive ion etch (RIE) with alternating sulfur hexafluoride (SF6) etching and octafluorobutene (C4F8) deposition.

FIGS. 11a and 11b show additional steps in one example process of forming fluid-handling or fluid-feed openings or slots in printhead 114. More specifically, FIG. 11a shows the cross-sectional, short axis profile or view of printhead 114 taken along line a-a of FIG. 2, while FIG. 11b shows the cross-sectional, long axis profile or view of printhead 114 taken along line b-b of FIG. 2. As shown in FIGS. 11a and 11b, two photo mask layers are formed on back-side surface 308 of substrate 304. A first metal dry etch masking layer 1000 (e.g., aluminum) is deposited and patterned, leaving an exposed area 1002 of back-side surface 308 of substrate 304. A second dry etch photo mask layer 1004 is deposited over first masking layer 1000 and over exposed area 1002. The second dry etch masking layer 1004 can comprise any suitable dry etch resistant material such as photoresist. The second dry etch masking layer 1004 is then patterned to expose a smaller portion of exposed area 1002, as shown in FIGS. 11a and 11b. Masking layers 1000 and 1004 can be patterned in any conventional manner. In one implementation, exposed area 1002 of back-side surface 308 has a width W4 that corresponds with the short axis of printhead 114 shown in FIG. 11a, and a length L4 that corresponds with the long axis of printhead 114 shown in FIG. 11b.

FIGS. 12a and 12b show additional steps in one example process of forming fluid-handling or fluid-feed openings or slots in printhead 114. More specifically, FIG. 12a shows the cross-sectional, short axis profile or view of printhead 114 taken along line a-a of FIG. 2, while FIG. 12b shows the cross-sectional, long axis profile or view of printhead 114 taken along line b-b of FIG. 2. As shown in FIGS. 12a and 12b, a dry etch process is performed to remove material from substrate 304 (i.e., to remove silicon), and form a deep trench 1100 in back-side surface 308 of substrate 304. A suitable dry etch process includes a silicon dry etch such as a plasma enhanced reactive ion etch (RIE) with alternating sulfur hexafluoride (SF6) etching and octafluorobutene (C4F8) deposition. The dimension of trench 1100 is controlled by the second dry etch masking layer 1004 (FIGS. 11a, 11b). After trench 1100 is formed, the second dry etch masking layer 1004 is removed. The first dry etch masking layer 1000 then remains on back-side surface 308 of substrate 304.

FIGS. 13a and 13b show additional steps in one example process of forming fluid-handling or fluid-feed openings or slots in printhead 114. More specifically, FIG. 13a shows the cross-sectional, short axis profile or view of printhead 114 taken along line a-a of FIG. 2, while FIG. 13b shows the cross-sectional, long axis profile or view of printhead 114 taken along line b-b of FIG. 2. As shown in FIGS. 13a and 13b, using a dry etch process, additional substrate material is removed from within trench 1100 to form slot 1200 all the way through substrate 304 from back-side surface 308 to front-side surface 306. In one example, as shown in the long axis view of FIG. 13b, the dry etch process removes substrate material from portions of exposed area 1002 (see FIGS. 11a, 11b) that extend beyond the ends of the slot 1200 so as to form recessed regions 1202 and 1204 in back-side surface 308 of substrate 304 at the ends of slot 1200.

Slot 1200 is generally defined by sidewalls that are substantially symmetrical from one side to the other side as shown in the short axis view of FIG. 13a, and substantially symmetrical from one end to the other end as shown in the long axis view of FIG. 13b. As shown in FIG. 13a, sidewalls in the short axis profile or view include a lower portion 1206 that is communicated with back-side surface 308 and substantially perpendicular to front-side surface 306 and back-side surface 308, and an upper portion 1208 that is communicated with front-side surface 306 and substantially perpendicular to front-side surface 306 and back-side surface 308. In one example, upper portion 1208 of the short axis sidewalls includes substantially parallel sidewalls, and lower portion 1206 of the short axis sidewalls includes substantially parallel sidewalls forming a stepped or square profile between back-side surface 308 and upper portion 1208.

As shown in FIG. 13b, sidewalls in the long axis profile or view include a middle portion 1210 that is substantially perpendicular to front-side surface 306 and back-side surface 308, an upper portion 1212 that is communicated with front-side surface 306, and recessed regions 1202 and 1204 that are communicated with back-side surface 308. In one example, upper portion 1212 of the long axis sidewalls includes recessed regions 1201 and 1203 that are communicated with front-side surface 306. In one example, middle portion 1210 of the long axis sidewalls includes substantially parallel sidewalls, and upper portion 1212 of the long axis sidewalls includes substantially parallel sidewalls forming a stepped or square profile between middle portion 1210 and front-side surface 306.

In one example, upper portion 1208 forms a first portion of a short axis profile of slot 1200 in the short axis view of FIG. 13a, and lower portion 1206 forms a second portion of a short axis profile of slot 1200 in the short axis view of FIG. 13a. In addition, upper portion 1212 forms a first portion of a long axis profile of slot 1200 in the long axis view of FIG. 13b, and recessed regions 1202 and 1204 and middle portion 1210 form a second portion of a long axis profile of slot 1200 in the long axis view of FIG. 13b. As such, a minimum dimension (i.e., width W5) of the first portion of the short axis profile of slot 1200 (i.e., upper portion 1208) is defined at front-side surface 306. In addition, a maximum dimension (i.e., length L5) of the first portion of the long axis profile of slot 1200 (i.e., upper portion 1212) is defined at front-side surface 306. Furthermore, a minimum dimension (i.e., length L6) of the long axis profile of slot 1200 is defined by middle portion 1210.

FIGS. 14a and 14b show additional steps in one example process of forming fluid-handling or fluid-feed openings or slots in printhead 114. More specifically, FIG. 14a shows the cross-sectional, short axis profile or view of printhead 114 taken along line a-a of FIG. 2, while FIG. 14b shows the cross-sectional, long axis profile or view of printhead 114 taken along line b-b of FIG. 2. As shown in FIGS. 14a and 14b, after slot 1200 is formed through substrate 304 and masking layer 1000 is removed from back-side surface 308, a protective coating or layer 1400 is formed on sidewalls of slot 1200 in the short axis view and the long axis view. More specifically, protective layer 1400 is formed on lower portion 1206 and upper portion 1208 of the short axis sidewalls, and formed on recessed regions 1202 and 1204 and middle portion 1210 of the long axis sidewalls. As shown in FIG. 14b, however, protective layer 1400 is excluded from or not provided on upper portion 1212 of the long axis sidewalls, as further described below. In one example, as also shown in FIGS. 14a and 14b, protective layer 1400 is also formed on back-side surface 308 and on an underside (i.e., chamber-side) of nozzle plate 316. In another example, however, protective layer 1400 is excluded from or not formed on back-side surface 308.

Similar to that described above with reference to protective layer 800, protective layer 1400 may be formed of metals, or ceramic materials such as oxides, nitrides, carbides, borides, and mixtures thereof. In one example, protective layer 1400 is a metal film such as tantalum. Also similar to that described above with reference to protective layer 800, in one example, protective layer 1400 is formed by physical vapor deposition (PVD). More specifically, protective layer 1400 is formed by directionally depositing material of protective layer 1400 from back-side surface 308 toward front-side surface 306, as represented by arrows 1401. As such, the directionally deposited material of protective layer 1400 coats the first and second portions of the short axis profile of slot 1200 (e.g., upper portion 1208 and lower portion 1206), and coats the second portion of the long axis profile of slot 1200 (e.g., recessed regions 1202 and 1204 and middle portion 1210).

As the first portion of the long axis profile of slot 1200 (i.e., upper portion 1212) is "recessed" (e.g., recessed regions 1201 and 1203) relative to the second portion of the long axis profile of slot 1200 (viz., middle portion 1210), the directionally deposited material of protective layer 1400 does not coat the first portion of the long axis profile of slot 1200 (i.e., does not coat recessed regions 1201 and 1203 of upper portion 1212) since the first portion of the long axis profile of slot 1200 is not "exposed" to the directional deposition. Accordingly, depositing of the protective material and, therefore, formation of protective layer 1400 is excluded from upper portion 1212 of the long axis profile of slot 1200. In one example, with the directional depositing of material for protective layer 1400 from back-side surface 308 toward front-side surface 306, protective layer 1400 is also formed on back-side surface 308 and on an underside (i.e., chamber-side) of nozzle plate 316. Protective layer 1400, however, may be excluded from or not formed on back-side surface 308.

By forming a protective layer (e.g., protective layers 800, 1400) on the sidewalls of the fluid-handling or fluid-feed openings or slots (e.g., slots 302, 1200) formed through the substrate of the printhead (e.g., printhead 114), a printhead substrate (i.e., die) with increased reliability is provided. More specifically, with the substrate formed of silicon, coating the sidewalls of the fluid-handling or fluid-feed openings or slots with the protective layer, reduces interaction of the ink with the substrate and helps to prevent etching of the silicon by the ink, thereby helping to reduce the formation of silicates in the nozzles and on the resistor and thus improve reliability of the printhead. As areas at the front-side surface of the substrate are under tension, excluding or not forming the protective layer on these areas (e.g., recessed regions 701, 703 and 1201, 1203) helps to prevent etch flaws from developing in these areas where coating defects may be present such that strength of the substrate is retained with minimal increased risk of silicon etching and silicate formation.

Although specific examples have been illustrated and described herein, it will be appreciated by those of ordinary skill in the art that a variety of alternate and/or equivalent implementations may be substituted for the specific examples shown and described without departing from the scope of the present disclosure. This application is intended to cover any adaptations or variations of the specific examples discussed herein. Therefore, it is intended that this disclosure be limited only by the claims and the equivalents thereof.

What is claimed is:

1. A method of forming a substrate for a fluid ejection device, the substrate having a first side and a second side opposite the first side, the method comprising:
    forming an opening through the substrate, the opening having a long axis profile and a short axis profile, the long axis profile including a first portion extending from a minimum dimension of the long axis profile to the first side of the substrate, and a second portion including and extending from the minimum dimension of the long axis profile to the second side of the substrate;
    forming a protective layer on sidewalls of the second portion of the long axis profile of the opening and excluding the protective layer from sidewalls of the first portion of the long axis profile of the opening; and
    forming the protective layer on sidewalls of the short axis profile of the opening extending from the second side of the substrate to the first side of the substrate.

2. The method of claim 1, wherein the first portion of the long axis profile of the opening has one of an angled profile and a stepped profile.

3. The method of claim 1, wherein a maximum dimension of the first portion of the long axis profile is provided at the first side of the substrate.

4. The method of claim 1, wherein forming the protective layer includes directionally depositing the protective layer on the sidewalls of the second portion of the long axis profile of the opening from the second side of the substrate.

5. The method of claim 1, wherein forming the protective layer further includes forming the protective layer on the second side of the substrate.

6. The method of claim 1, wherein forming the opening through the substrate includes forming a portion of the opening in the substrate from the second side toward the first side; and, thereafter, further forming the opening in the substrate to the first side, including anistropically wet etching the substrate to form the first portion of the long axis profile of the opening with an angled profile.

7. The method of claim 1, wherein forming the opening through the substrate includes forming a portion of the opening in the substrate from the first side toward the second side, including dry etching the substrate to form the first portion of the long axis profile of the opening with a stepped profile; and, thereafter, forming another portion of the opening in the substrate from the second side toward the first side; and, thereafter, completing forming the opening through the substrate.

8. A method of forming a fluid ejection device, the method comprising:
    providing a substrate having a first side, a second side opposite the first side, and a thin-film structure formed on the first side;
    forming an opening through the substrate between the first side and the second side;
    forming a protective layer on opposite end walls of a length of the opening other than portions of the end walls extending from a minimum dimension of the length of the opening to the first side of the substrate; and
    forming the protective layer on opposite sidewalls of a width of the opening extending from the second side of the substrate to the first side of the substrate.

9. The method of claim 8, wherein a dimension of the length of the opening at the first side of the substrate is greater than the minimum dimension of the length of the opening.

10. The method of claim 8, wherein forming the protective layer on the opposite end walls of the length of the opening includes forming the protective layer on portions of the opposite end walls including and extending from the minimum dimension of the length of the opening to the second side of the substrate.

11. The method of claim 8, wherein forming the protective layer on the opposite end walls of the length of the opening includes directionally depositing the protective layer from the second side of the substrate.

12. A fluid ejection device, comprising:
a substrate having a first side and a second side opposite the first side;
a thin-film structure formed on the first side of the substrate;
a fluid feed slot formed by an opening extending through the substrate between the first side and the second side; and
a protective coating formed on sidewalls provided on opposite sides of a width of the fluid feed slot extending from the second side of the substrate to the first side of the substrate and formed on end walls provided at opposite ends of a length of the fluid feed slot, wherein the protective coating is excluded from recessed regions of the fluid feed slot communicated with the first side of the substrate at the opposite ends of the length of the fluid feed slot.

13. The fluid ejection device of claim 12, wherein the recessed regions of the fluid feed slot have one of an angled profile and a stepped profile.

14. The fluid ejection device of claim 12, further comprising:
the protective coating formed on the second side of the substrate.

* * * * *